(12) United States Patent
Duzett

(10) Patent No.: US 7,346,738 B2
(45) Date of Patent: *Mar. 18, 2008

(54) CACHE MEMORY FOR A SCALABLE INFORMATION DISTRIBUTION SYSTEM

(75) Inventor: Robert C Duzett, Hillsboro, OR (US)

(73) Assignee: Broadband Royalty Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/709,372

(22) Filed: Feb. 21, 2007

(65) Prior Publication Data

US 2007/0162694 A1    Jul. 12, 2007

Related U.S. Application Data

(63) Continuation of application No. 10/832,489, filed on Apr. 26, 2004, now Pat. No. 7,200,718.

(51) Int. Cl.
    *G06F 15/62*    (2006.01)
(52) U.S. Cl. ................ 711/130; 725/145; 711/121; 711/120; 709/216
(58) Field of Classification Search ............... None
    See application file for complete search history.

(56) References Cited

U.S. PATENT DOCUMENTS

| | | | |
|---|---|---|---|
| 5,872,588 A * | 2/1999 | Aras et al. | 725/14 |
| 6,173,374 B1 * | 1/2001 | Heil et al. | 711/148 |
| 7,096,323 B1 * | 8/2006 | Conway et al. | 711/147 |
| 2002/0152318 A1 * | 10/2002 | Menon et al. | 709/231 |

OTHER PUBLICATIONS

White, Ron. How Computers Work. 6th ed. 2002, Ziff-Davis Press. pp. 314-317.*

* cited by examiner

*Primary Examiner*—B. James Peikari
(74) *Attorney, Agent, or Firm*—FSP LLC

(57) ABSTRACT

An information distribution system includes an interconnect and multiple data processing nodes coupled to the interconnect. Each data processing node includes mass storage and a cache. Each data processing node also includes interface logic configured to receive signals from the interconnect and to apply the signals from the interconnect to affect the content of the cache, and to receive signals from the mass storage and to apply the signals from the mass storage to affect the content of the cache. The content of the mass storage and cache of a particular node may also be provided to other nodes of the system, via the interconnect.

3 Claims, 9 Drawing Sheets

CACHE MEMORY FOR A SCALABLE INFORMATION DISTRIBUTION SYSTEM

PRIORITY CLAIM

The present application is a continuation of United States patent application CACHE MEMORY FOR A SCALABLE INFORMATION DISTRIBUTION SYSTEM, having application Ser. No. 10/832,489, filed on Monday, Apr. 26, 2004 now U.S. Pat. No. 7,200,718.

TECHNICAL FIELD

The present disclosure relates to cache memory for scalable information distribution systems.

BACKGROUND

The distribution of digital video, audio, and other forms of complex information presents many design challenges. These challenges arise from the large storage requirements of such information, as well as the high bandwidth and processing requirements to distribute such information.

A high-performance information distribution system may include multiple processors, mass storage components, memories, and input/output components arranged to operate in a parallel (substantially simultaneous) fashion. Such systems, when properly designed, may provide for the simultaneous distribution of multiple high-resolution digital audio/video streams for cable television, the Internet, satellite television, and so on.

One performance limitation in such systems arises from mass storage. Mass storage generally involves large-capacity machine memory devices, such as magnetic and optical disks. Mass storage usually provides for the preservation of information (persistence) even in the absence of power applied to the memory. Mass storage generally provides a lower cost per storage metric than is available with smaller memories that lack persistence. For example, magnetic and optical disks generally provide a lower cost per megabyte, gigabyte, and terabyte of stored information than is available with non-persistent random access memory (RAM), flash memory, dynamic RAM (DRAM), static RAM (SRAM), and so on. However, mass storage is also generally characterized by slower read/write (access) times than smaller, non-persistent memories.

Cache memory may be provided to partially compensate for the slower read/write times of mass storage. Information of the mass storage that is frequently accessed may be duplicated in a cache memory that is, relative to the mass storage, lower in storage capacity and characterized by lower access times. Cache memories are typically non-persistent.

Various caching schemes are described by United States patents and/or published patent applications having numbers U.S. Pat. No. 5,835,942
U.S. Pat. No. 6,463,509
U.S. Pat. No. 6,370,614
U.S. Pat. No. 6,370,615
U.S. Pat. No. 5,289,581
20030005457

These patents describe schemes whereby cache memory benefits a particular processing node with which it is associated.

Various caching schemes are also described by United States patents and/or published patent applications having numbers 20030095783
U.S. Pat. No. 6,061,504
U.S. Pat. No. 4,371,929
U.S. Pat. No. 4,977,495
U.S. Pat. No. 4,476,526
U.S. Pat. No. 4,394,733

These patents describe schemes whereby cache memory is globally available to processing nodes of the system.

United States patents and published patent applications having numbers 20030200388
20030177305
U.S. Pat. No. 6,467,022 describe "solid-state disk" memory schemes.

U.S. Pat. No. 4,920,478 describes a mass storage controller having an integrated cache memory.

U.S. Pat. No. 5,933,603 describes a buffering scheme.

U.S. Pat. No. 5,535,116 describes a global distributed memory scheme.

U.S. Pat. Nos. 5,893,163 and 5,860,101 describe a memory partitioning scheme including cache memory.

Global caching schemes tend to be expensive, complicated, and may tend to scale poorly as processing nodes are added to the system. Schemes that associate a cache with a particular processing node (including schemes that integrate a cache memory with a mass storage controller) may forfeit benefits available from underutilized caches on other nodes.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

One implementation of an information distribution system includes an interconnect and multiple data processing nodes coupled to the interconnect. Each data processing node includes mass storage and a cache. Each data processing node also includes interface logic configured to receive signals from the interconnect and to apply the signals from the interconnect to affect the content of the cache, and to receive signals from the mass storage and to apply the signals from the mass storage to affect the content of the cache. The system may also include cache manager logic coupled to the interconnect and configured to affect, via the interconnect, the content of the cache of each data processing node. Each data processing node may include I/O logic configured to cooperate with the interface logic to retrieve, via the interconnect, content from the cache and mass storage of any node. The cache of a particular data processing node may include content of the mass storage of that node, and/or content of the mass storage of one or more other nodes.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any configuration of circuits and/or memory that may be applied to affect operations within a device. Logic may comprise signals stored in a device memory and applied to a processing device, such as a microprocessor, digital signal processor, microcontroller, and so on. Software is one example of such logic. Examples of device memories that may comprise logic include RAM (random access memory), flash memories, ROMS (read-only memories), EPROMS (erasable programmable read-only memories), mass storage, cache memories, and EEPROMS. Logic may also be comprised by digital and/or analog electrical hardware circuits. Logic may be formed from combinations of software and hardware.

Figure 1:
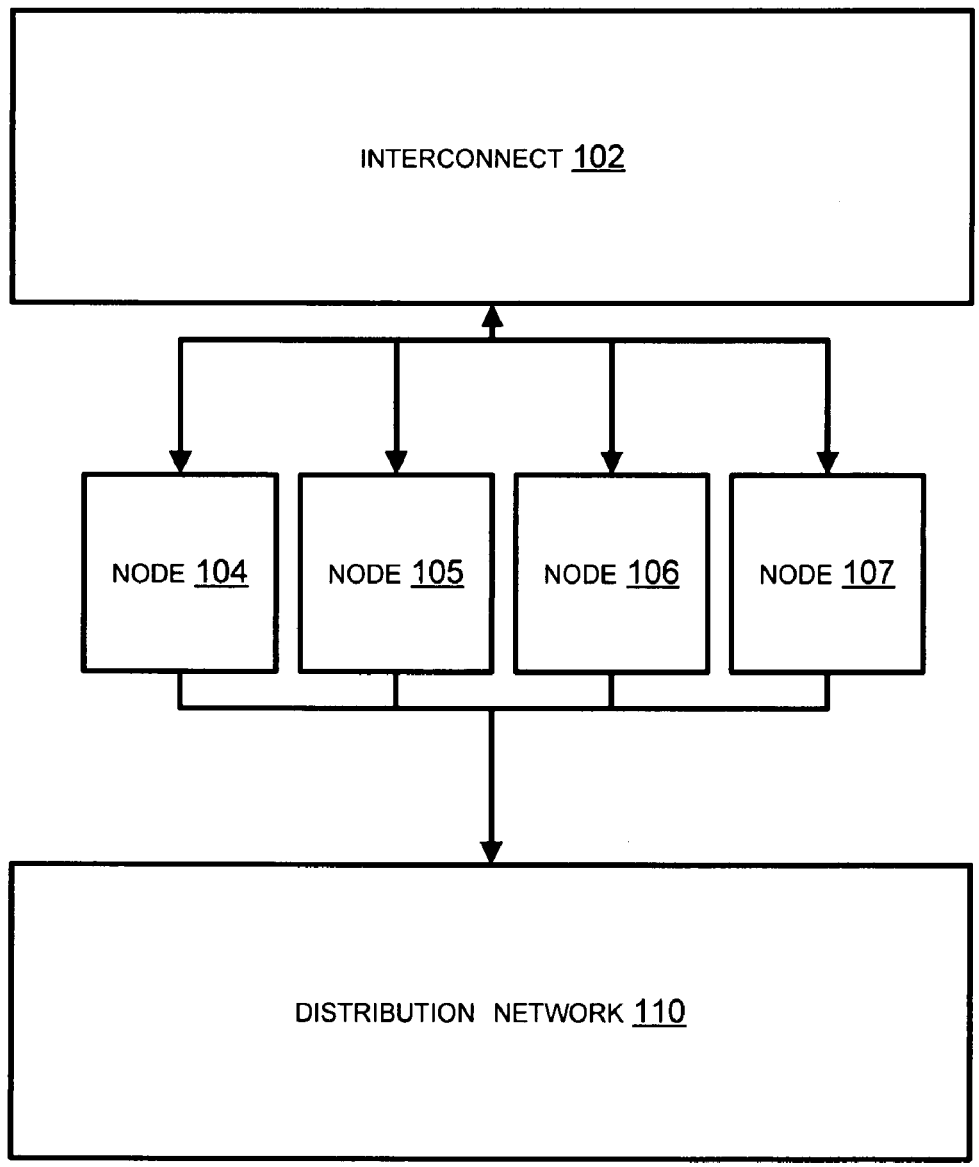
FIG. 1 is a block diagram of an embodiment of an information distribution system having multiple data processing nodes.

FIG. 1 is a block diagram of an embodiment of an information distribution system having multiple data processing nodes. A node is a collection of storage and information processing functionality. To simplify the discussion, various elements are omitted from the description of the nodes, which could possibly include one or more processors, schedulers, arbiters, memories, circuits, busses, interfaces, and so on.

Various data processing nodes 104-107 communicate with one another via an interconnect 102. Within a particular node, elements may communicate "locally" with one another without resort to an interconnect. In other words, inter-node communications takes place via the interconnect 102, and intra-node communications takes place without use of the interconnect 102.

The interconnect 102 may comprise one or more routers, switches, data networks, cross-connects, high-performance busses, and/or other mechanisms for routing electrical and/or optical information. The interconnect routes communication between devices coupled to the interconnect, according to an address or other destination identifier associated with the communication. The data processing nodes 104-107 communicate information, via the interconnect 102, to a data distribution network 110.

Such a system may serve as an audio/video distribution system, where the nodes 104-107 provide the capability for simultaneous delivery of distinct audio/video streams to cable television, Internet, and other media distribution networks. The system is readily scalable, because mass storage, cache, and I/O capacity may be increased by including additional data processing nodes.

Figure 2:
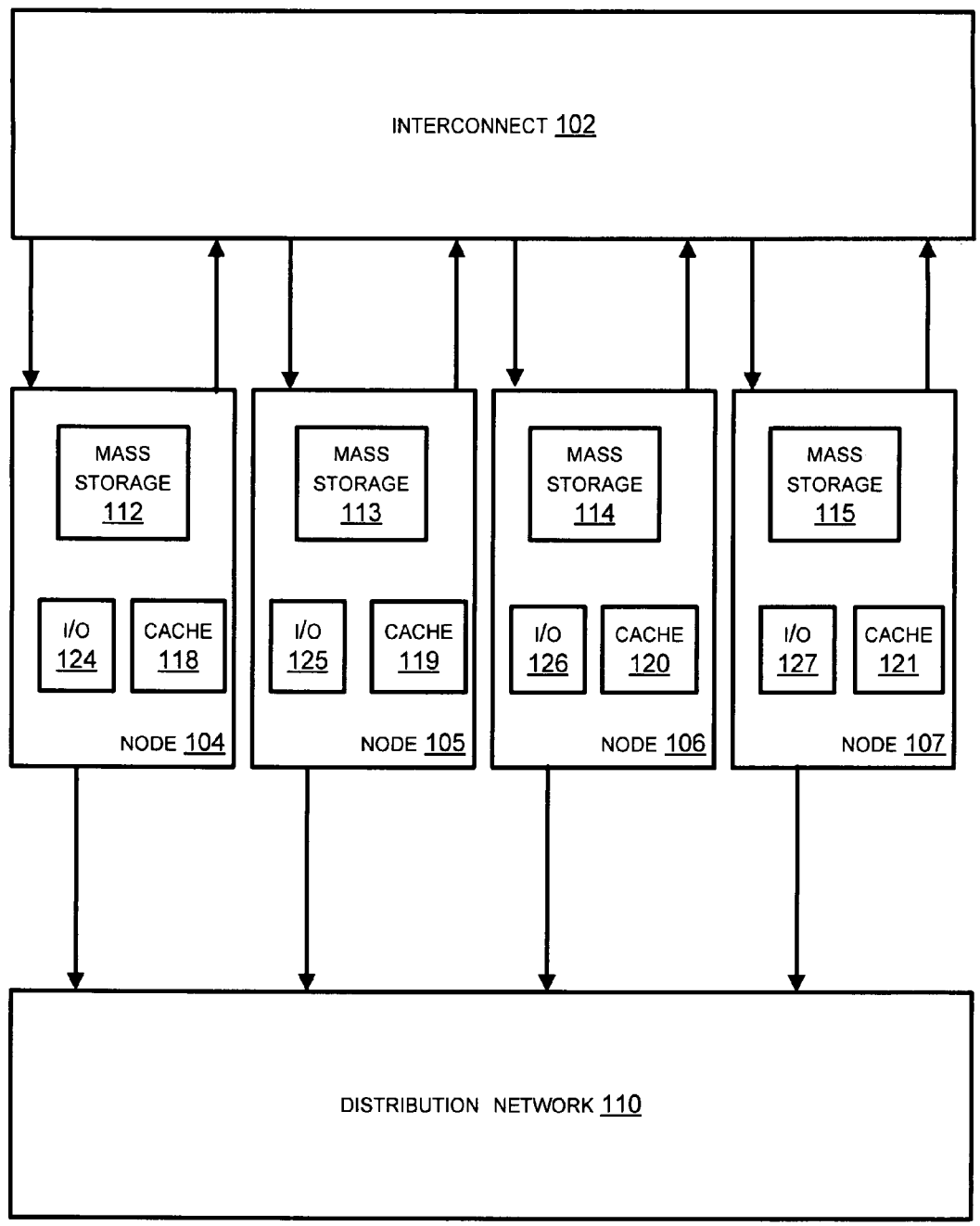
FIG. 2 is a block diagram showing in more detail the nodes of an embodiment of an information distribution system.

FIG. 2 is a block diagram showing in more detail the nodes of an embodiment of an information distribution system. The data processing nodes 104-107 each comprise mass storage, an information cache, and input/output (I/O) functionality. The term I/O herein is applied to logic that provides, either directly or via intervening stages, information from the information distribution system to an external system (such as the distribution network 110). I/O functionality may also, in some circumstances, receive information into the distribution system.

In particular, node 104 comprises mass storage 112, cache 118, and I/O 124. Node 105 comprises mass storage 113, cache 119, and I/O 125. Node 106 comprises mass storage 114, cache 120, and I/O 126. Node 107 comprises mass storage 115, cache 121, and I/O 127.

Each node 104-107 is coupled to the interconnect 102 and may via such coupling receive information from mass storage 112-115 and cache 118-121. The I/O 124-127 may receive information from the mass storage and/or cache of the node comprising the I/O, or from the mass storage and/or cache of a different node. Information comprised by a mass storage or cache may be referred to as content of the mass storage or cache.

To improve the performance of information delivery, information provided to the interconnect 102 by a particular mass storage may also be provided to the cache associated with the mass storage (e.g. the cache of the node comprising the mass storage). The cache may store a copy of the information, so that future accesses of the information by the I/O 124-127 are accomplished in less time than if such accesses were applied to the mass storage. The cache 118-121 may also access and store information of the mass storage 112-115 in a predictive fashion, before attempts to access such information are made by the I/O 124-127.

Figure 5:
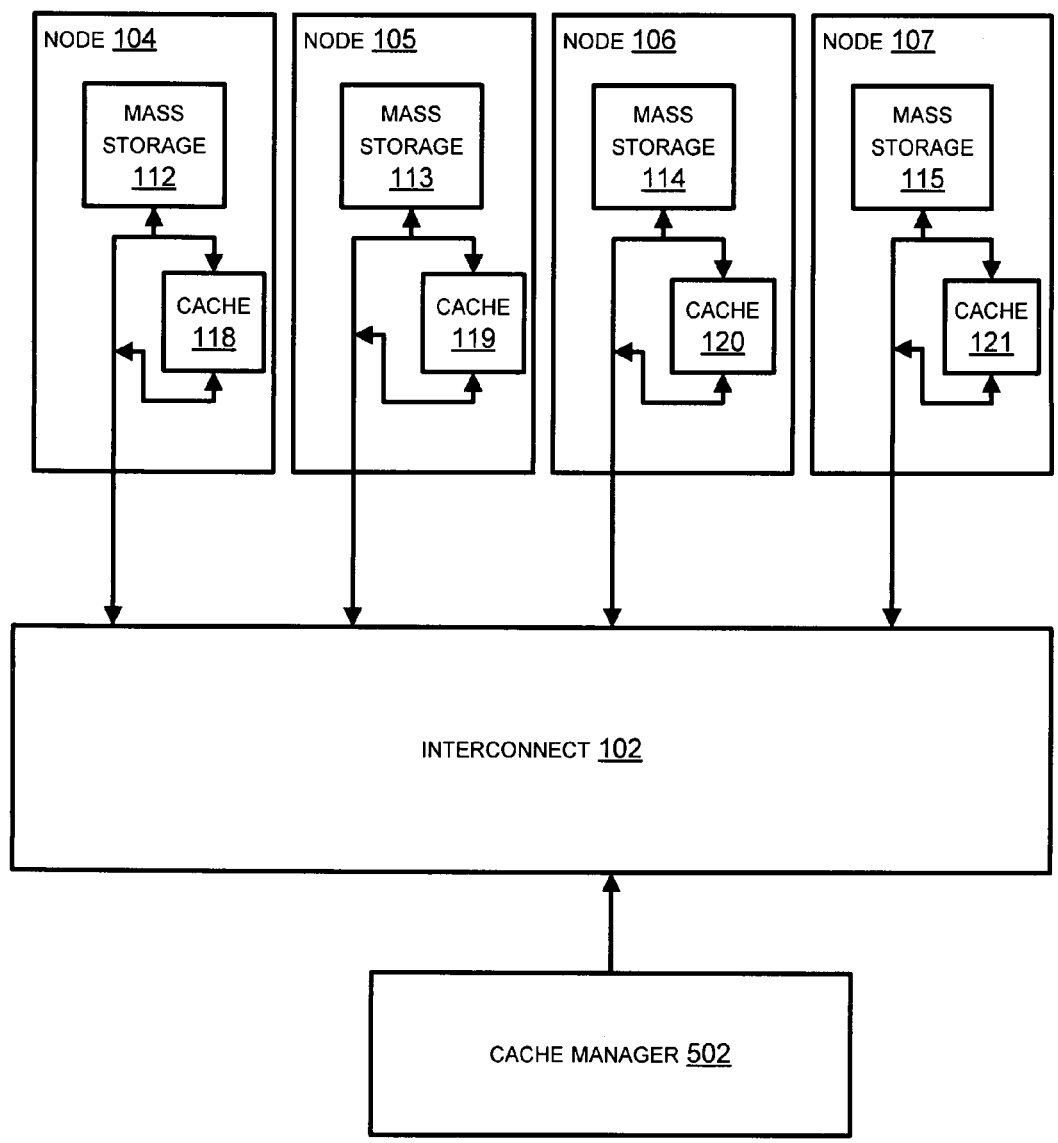
FIG. 5 is a block diagram of an embodiment of a data processing system including cache management.

The contents of a particular cache may be at least partially determined via control signals provided via the interconnect 102, as further described in conjunction with FIG. 5. To improve cache utilization, the contents of the cache 118-121 may be managed so that information is not duplicated between the caches of different nodes. Furthermore, a cache of a particular node may store information from a mass storage of a different node or nodes, benefiting situations where performance may be improved through caching of additional information from the other node or nodes. In other words, the cache 118-121 acts as a globally distributed cache for the content of the mass storage 112-115.

Figure 3:
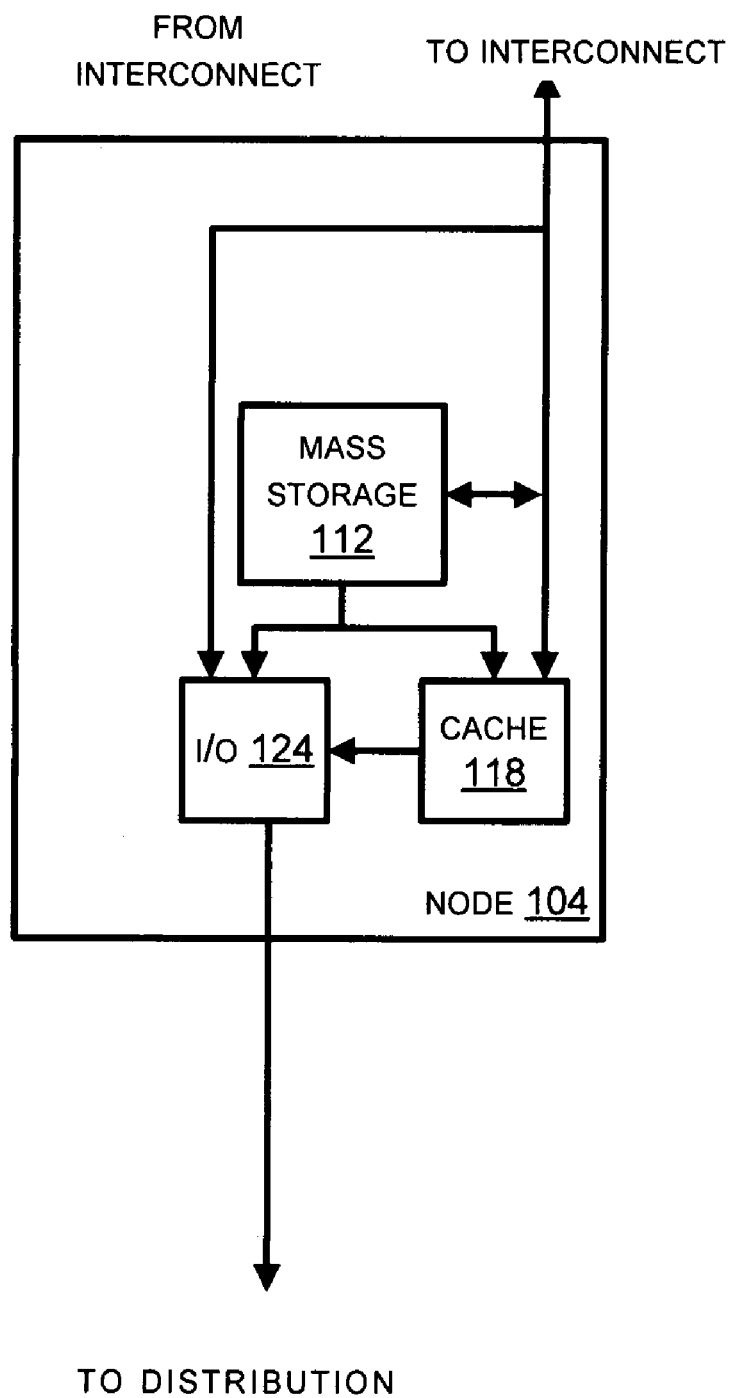
FIG. 3 is a block diagram of an embodiment of a node of a data processing system.

FIG. 3 is a block diagram of an embodiment of a node of a data processing system. The node 104 comprises mass storage 112, cache 118, and I/O 124. The mass storage 112 is coupled to the cache 118 and the I/O 124. The cache 118 is coupled to the I/O 124. The I/O 124 may access, via the interconnect 102, information of another mass storage and/or cache of the system. The I/O 124 may also access information of the mass storage 112 and/or cache 118 "locally", e.g. without communicating the information via the interconnect 102. Bypassing the interconnect 102 in this fashion may improve the performance of information distribution when information accessed by an I/O is content of the same node comprising the I/O.

Figure 4:
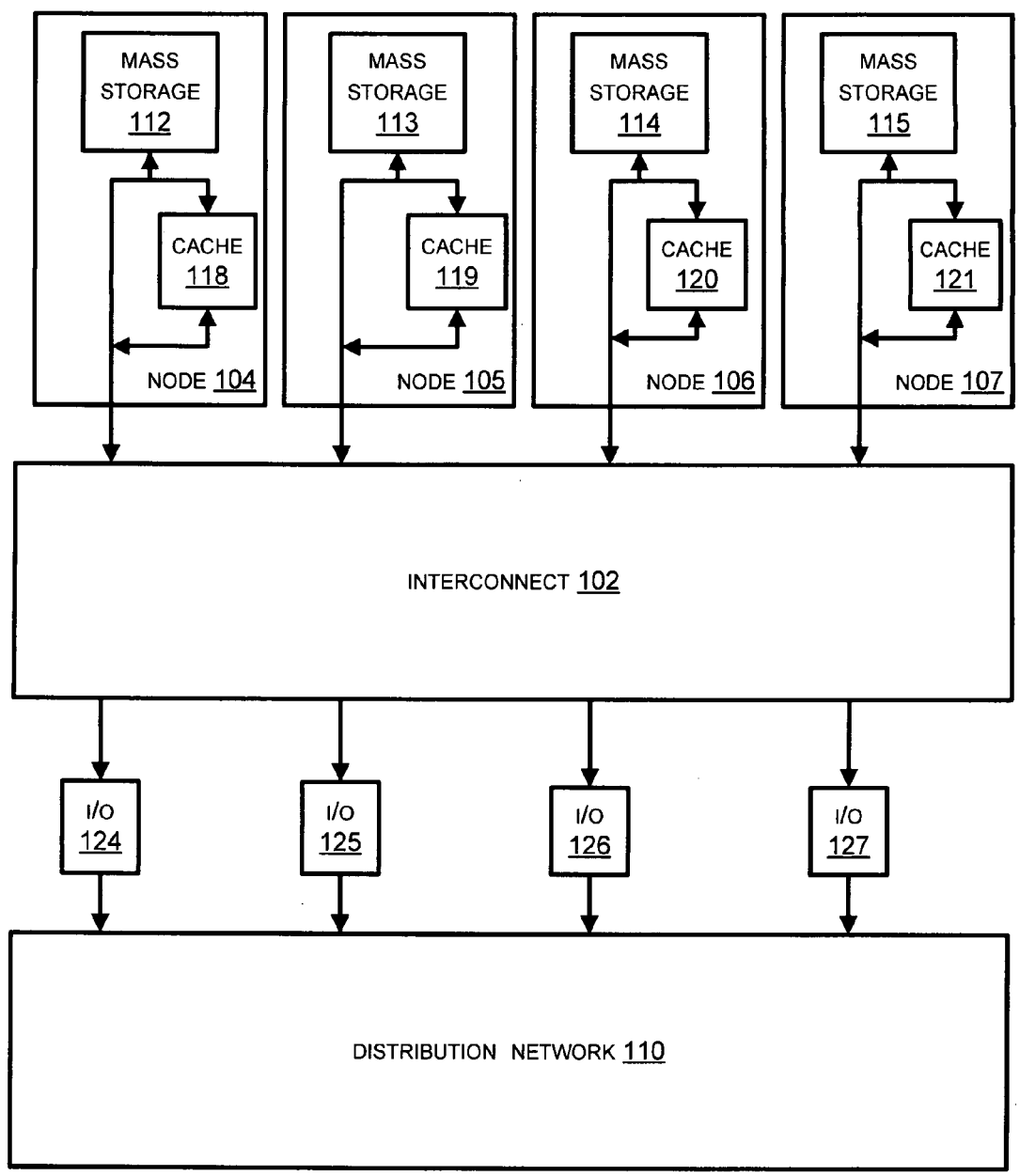
FIG. 4 is a block diagram of an embodiment of a data processing system comprising separate mass storage and I/O nodes.

FIG. 4 is a block diagram of an embodiment of a data processing system comprising separate mass storage and I/O nodes. The nodes 104-107 comprise mass storage and cache functionality. I/O functionality is provided distinctly from mass storage and cache functionality, via I/O logic 124-127. The nodes 104-107 may be referred to as storage nodes, and the I/O 124-127 may be referred to as I/O nodes. Thus, mass storage and cache capacity may be increased by including additional storage nodes. I/O capacity may be increased independently of storage and cache capacity by including additional I/O nodes. The I/O 124-127 accesses information of the mass storage 112-115 and cache 118-121 via the interconnect 102. The cache of a particular storage node may store content from the mass storage of the node comprising the cache, and/or the content of the mass storage of one or more other storage nodes. In other words, the cache 118-121 is available to all storage nodes as a global, distributed cache resource.

FIG. 5 is a block diagram of an embodiment of a data processing system including cache management. The cache 118-121 is coupled to the interconnect 102 in such a manner that information of the cache 118-121 may be accessed by I/O 124-127 via the interconnect 102. Control and/or information access is also provided between the interconnect 102 and the cache 118-121. Cache manager logic 502 is coupled to the interconnect 102 and may influence the contents of the cache 118-121 via the interconnect 102.

Other systems may include couplings between the cache manager 502 and the cache 118-121 that do not involve the interconnect 102. In such systems the cache manager 502 may influence the contents of the cache 118-121 without communicating signals and/or information via the interconnect 102.

The cache manager 502 may influence (affect) the contents of the cache 118-121 according to past, present, and/or predicted information distribution demands. For example, information of a particular one of the mass storage 112-115 that is predicted to be in high demand may be stored in multiple ones of the cache 118-121 (without significant duplication). Information distribution performance may thus be improved through utilization of a global distributed cache resource, while maintaining scalability benefits of modular mass storage, cache, and I/O.

Figure 6:
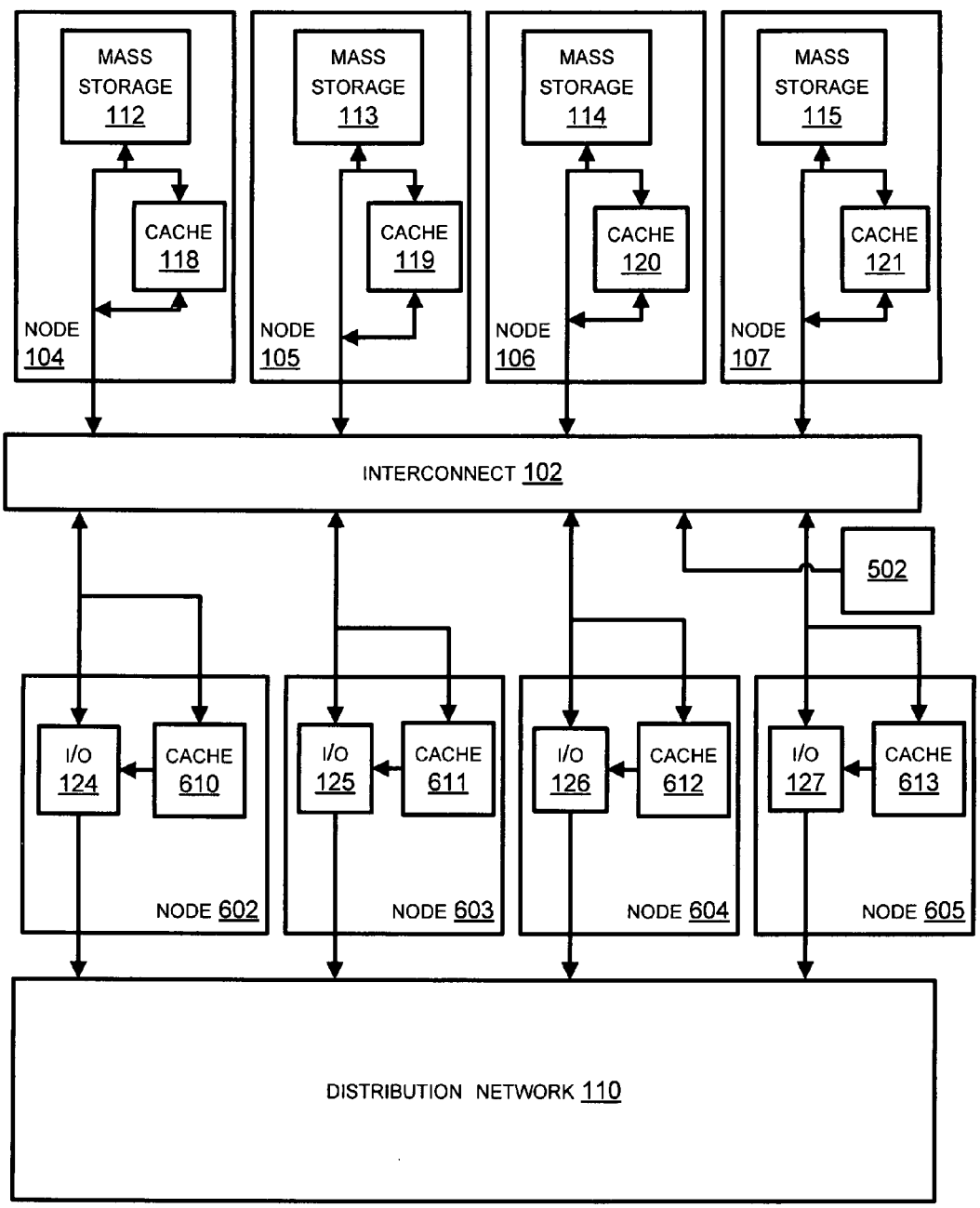
FIG. 6 is a block diagram of another embodiment of a data processing system including cache management.

FIG. 6 is a block diagram of another embodiment of a data processing system including cache management. Storage nodes 104-107 comprise mass storage and cache. In particular, storage node 104 comprises mass storage 112 and cache 118, storage node 105 comprises mass storage 113 and cache 119, storage node 106 comprises mass storage 114 and cache 120, and storage node 107 comprises mass storage 115 and cache 121.

I/O nodes 602-605 comprise I/O functionality and cache. In particular, I/O node 602 comprises I/O 124 and cache 610, I/O node 603 comprises I/O 125 and cache 611, I/O node 604 comprises I/O 126 and cache 612, and I/O node 605 comprises I/O 127 and cache 613. The cache 118-121 may be referred to as storage cache, and the cache 610-613 may be referred to as I/O cache. The interconnect 102 is coupled to access information of the storage cache 118-121. The I/O cache 610-613 is coupled to receive and store information provided to the I/O nodes 602-605 via the interconnect 102. A particular one of the I/O 124-127 may access information of the cache 118-121, and information of the cache comprised by the I/O node to which the I/O belongs. For example, I/O 124 may access information of the cache 118-121, and further may access information of the cache 610. The information stored by the cache of an I/O node may be determined according to previous, present, and predicted information distributed by the I/O of that node. It is also possible that the information stored by an I/O cache may be determined by information distributed by I/O nodes other than the I/O node comprising the cache (for example, where multiple I/O nodes cooperate to distribute a related set of information). The cache manager 502 may operate via the interconnect 102 to at least partially affect the information stored by the I/O cache 610-613. In other words, the cache 118-121 and the I/O cache 610-613 may be operated to provide the benefits of a global, distributed cache to the I/O 124-127, while maintaining at least some of the benefits of local I/O caching.

Other systems may include couplings between the cache manager 502 and the I/O cache 610-613 that do not involve the interconnect 102. In such systems the cache manager 502 may influence the contents of the I/O cache 610-613 without communicating signals and/or information via the interconnect 102.

Figure 7:
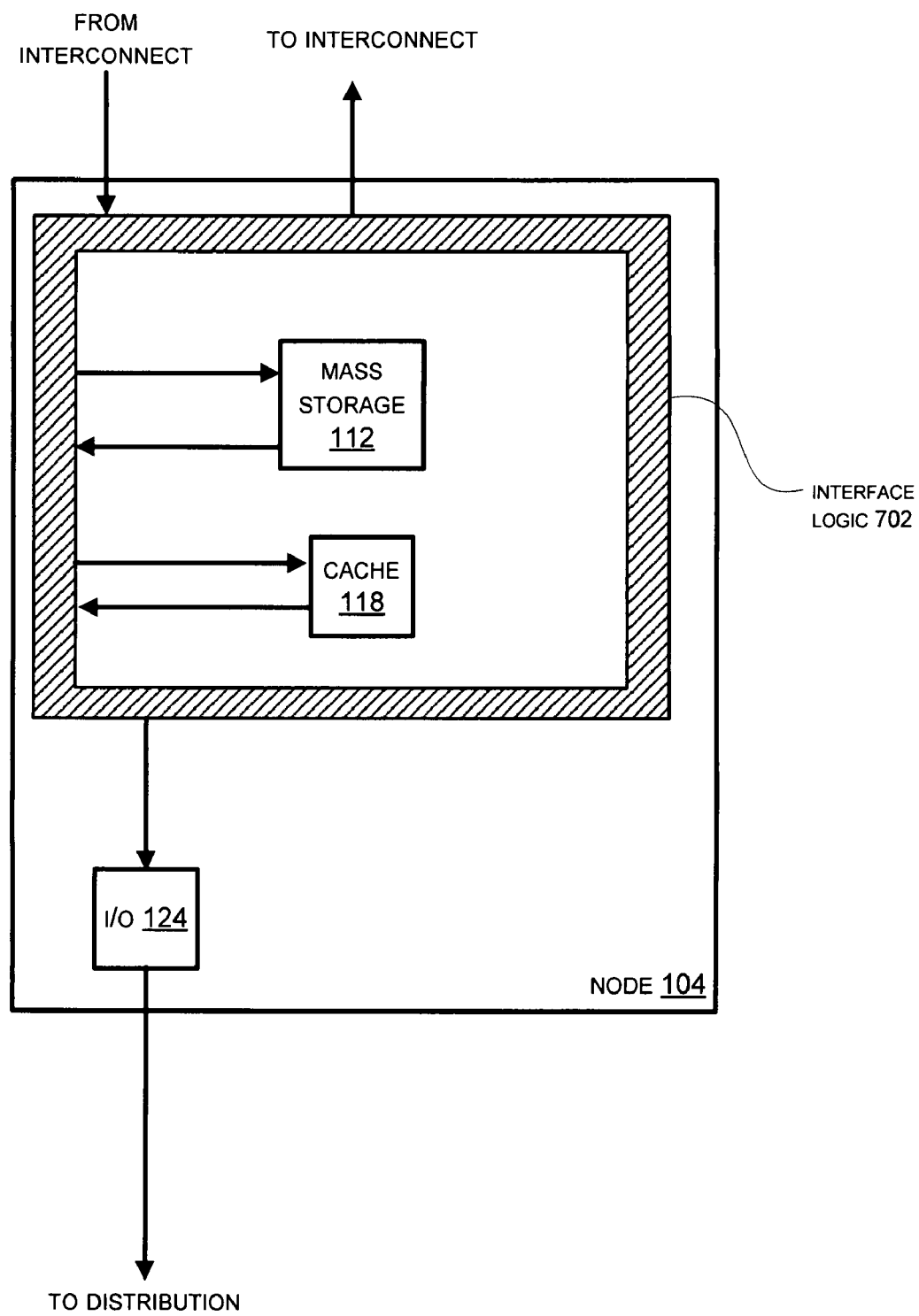
FIG. 7 is a block diagram of an embodiment of a node of a data processing system, including interface logic.

FIG. 7 is a block diagram of an embodiment of a node of a data processing system, including interface logic. The interface logic 702 is configured to receive signals from the interconnect 102 and to apply the signals from the interconnect 102 to affect the content of the cache 118. The interface logic 702 is further configured to receive signals from the mass storage 112 and to apply the signals from the mass storage 112 to affect the content of the cache 118. The interface logic 702 may be further configured to provide content from the cache 118 and mass storage 112 to the interconnect 102. The I/O logic 124 may be configured to cooperate with the interface logic 702 to retrieve content from the cache 118, mass storage 112, and/or interconnect 102. In systems where the I/O logic 124 is comprised by an I/O node (e.g. I/O node 602 of FIG. 6), the I/O logic 124 may be configured to cooperate with the interface logic of each storage node to retrieve via the interconnect information content from the cache and mass storage of each storage node.

Figure 8:
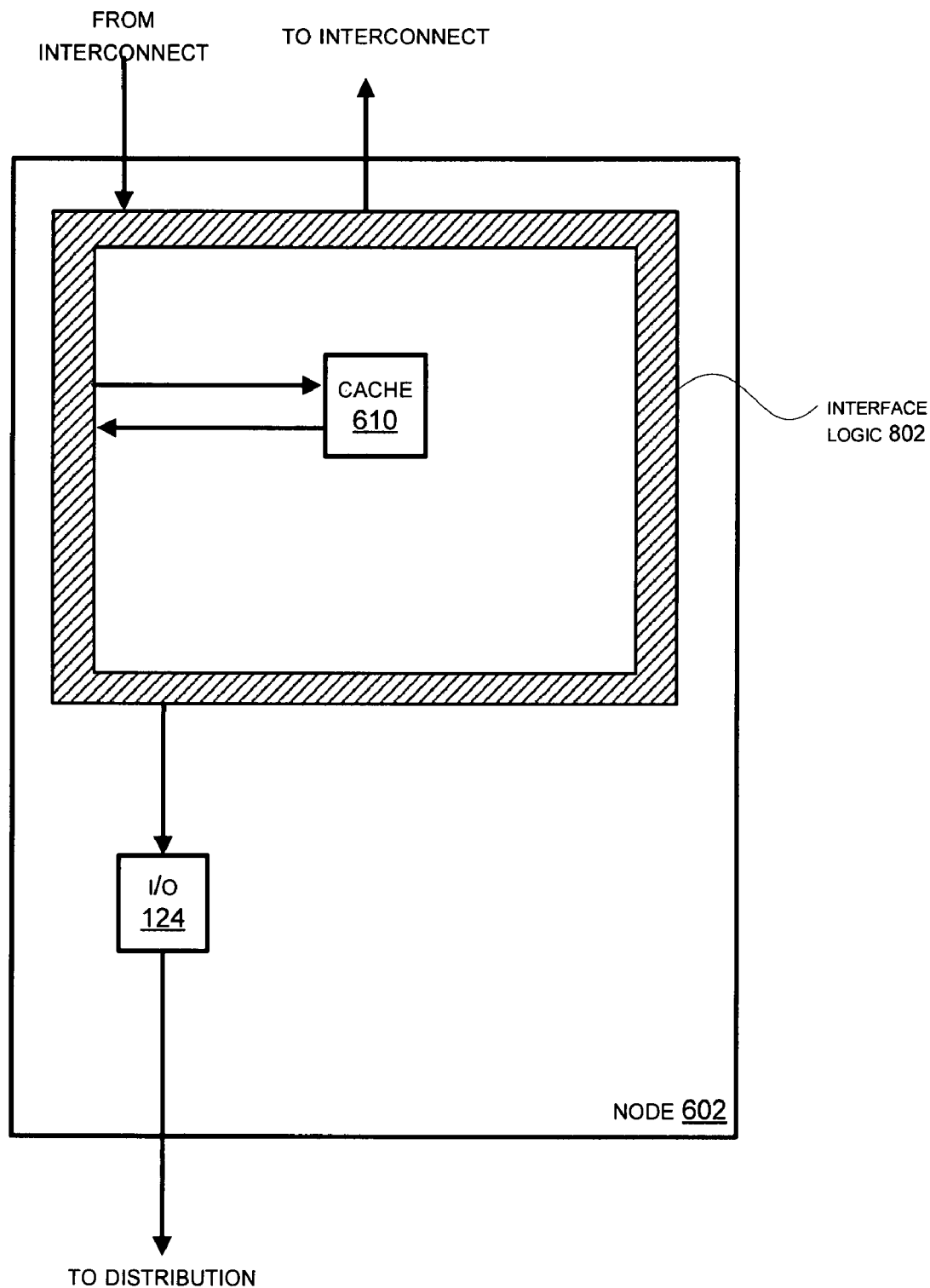
FIG. 8 is a block diagram of an embodiment of an I/O node of a data processing system, including interface logic.

FIG. 8 is a block diagram of an embodiment of an I/O node of a data processing system, including interface logic. The interface logic 802 is configured to receive signals from the interconnect 102 and to apply the signals from the interconnect 102 to affect the content of the cache 610. The interface logic 802 may be further configured to provide content from the cache 610 to the interconnect 102. The I/O logic 124 may be configured to cooperate with the interface logic 802 to retrieve content from the I/O cache 610, and from the cache and mass storage of various storage nodes and/or other I/O nodes.

Figure 9:
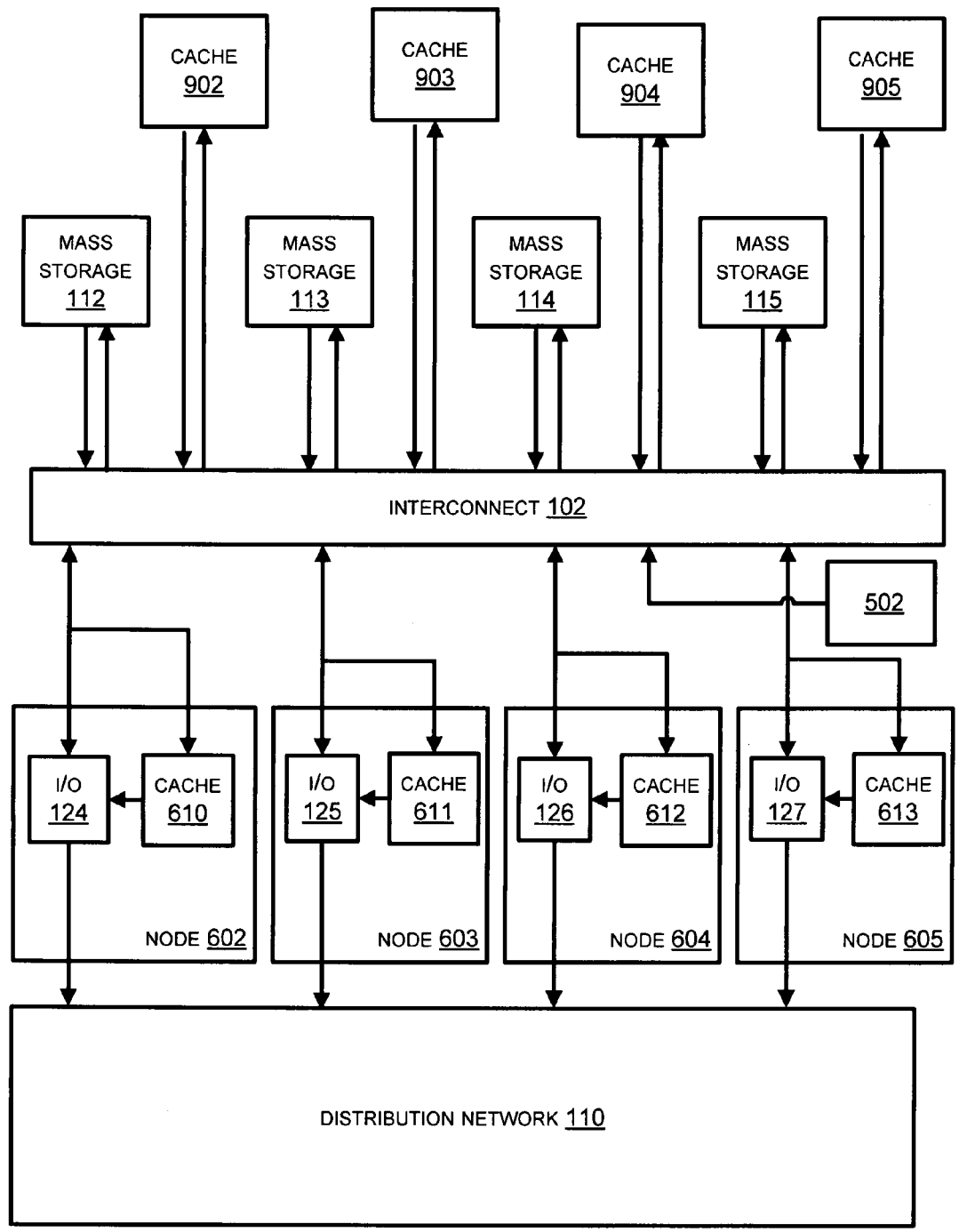
FIG. 9 is a block diagram of another embodiment of a data processing system including cache management.

FIG. 9 is a block diagram of another embodiment of a data processing system. The system comprises mass storage nodes 112-115, I/O nodes 602-605, and cache nodes 902-905. In this system I/O functionality, cache, and mass storage may each be added and removed independently of one another. Each cache node 902-905 may be configured to receive signals from the interconnect 102 and to apply the signals from the interconnect 102 to affect the content of the cache of that node. Each cache node 902-905 may be further configured to provide content from the cache of the node to the interconnect 102.

I/O nodes 602-605 comprise I/O functionality and, optionally, cache. The I/O nodes 602-605 are coupled to receive information provided via the interconnect 102. A particular I/O node 602-605 may access information of the cache nodes 902-905, the mass storage nodes 112-115, and (if the I/O node comprises a cache) information of the cache comprised by the I/O node to which the I/O belongs. For example, I/O node 602 may access information of the cache nodes 902-905, mass storage nodes 112-115, and further may access information of the cache 610. In some embodiments an I/O node may access information of the cache(s) of one or more other I/O nodes.

The information stored by the cache of any cache node may be determined according to previous, present, and predicted information distributed by any one or multiple ones of the I/O nodes 602-605. The cache manager 502 may operate via the interconnect 102 to affect the information stored by the cache nodes 902-905. Other systems may include couplings between the cache manager 502 and the cache nodes 902-905 that do not involve the interconnect 102. In such systems the cache manager 502 may influence the contents of the cache nodes 902-905 without communicating signals and/or information via the interconnect 102.

In some embodiments the cache manager 502 may also operate to at least partially affect the contents of the caches of the I/O nodes 602-605 according to the information distributed by various ones of the I/O nodes 602-605.

Various alternative arrangements include systems comprising greater or fewer storage and/or I/O and/or cache nodes, systems in which some storage nodes (or the cache and/or mass storage of the storage nodes) are unavailable or available on a limited basis to some I/O logic and/or I/O and/or cache nodes, and so on.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. An audio/video distribution system comprising:
   logic to enable a first node to access first parts of an audio/video stream from mass storage local to the first node and to provide the first parts of the stream to an external distribution network via at least one I/O port local to the first node;
   logic to enable the first node to cache the first parts in cache memory local to the first node;
   logic to enable a second node to access second parts of the audio/video stream from mass storage local to the second node and to provide the second parts of the stream to the external distribution network via at least one I/O port local to the second node;
   logic to enable the second node to cache the second parts in cache memory local to the second node;
   logic to enable the first node to access the cache memory local to the second node for second parts different from the first parts cached in the cache memory local to the first node, and to stream the second parts that are different via the I/O port local to the first node; and
   logic to enable the second node to access the cache memory local to the first node for first parts different than the second parts, and to stream the first parts that are different via the I/O port local to the second node.

2. The audio/video distribution system of claim 1, further comprising:
   logic to enable a third node to access third parts of the audio/video stream from mass storage local to the third node and to provide the third parts of the stream to the external distribution network via at least one I/O port local to the third node;
   logic to enable the third node to cache the third parts in cache memory local to the third node; and
   logic to enable the third node to access the cache memories local to the first and second node for first and second parts different than the third parts, and to stream the first and second parts that are different via the I/O port local to the third node.

3. The audio/video distribution system of claim 2, further comprising:
   logic to manage local caches of the first, second, and third nodes as a single global cache memory so that when multiple nodes are providing data to the external distribution network from a same stream of audio/video information via multiple local I/O ports, parts of the stream are not duplicated in local caches of the multiple nodes.

* * * * *